(12) United States Patent
Sendai et al.

(10) Patent No.: US 8,454,258 B2
(45) Date of Patent: Jun. 4, 2013

(54) SWIVEL JOINT

(75) Inventors: Tomokazu Sendai, Yamatokohriyama (JP); Yasushi Kamada, Yamatokohriyama (JP); Hisanori Kobayashi, Toyota (JP)

(73) Assignees: Nitta Corporation, Osaka (JP); Toyota Jidosha Kabushiki Kaisha, Aichi (JP)

( * ) Notice: Subject to any disclaimer, the term of this patent is extended or adjusted under 35 U.S.C. 154(b) by 461 days.

(21) Appl. No.: 12/451,446

(22) PCT Filed: May 14, 2008

(86) PCT No.: PCT/JP2008/058803
§ 371 (c)(1),
(2), (4) Date: Dec. 28, 2009

(87) PCT Pub. No.: WO2008/143073
PCT Pub. Date: Nov. 27, 2008

(65) Prior Publication Data
US 2010/0101358 A1    Apr. 29, 2010

(30) Foreign Application Priority Data
May 15, 2007 (JP) .................. 2007-129464

(51) Int. Cl.
*F16C 11/00* (2006.01)
(52) U.S. Cl.
USPC ............................................ 403/38; 403/34

(58) Field of Classification Search
USPC ................ 403/34, 35, 38, 37; 901/28, 29, 43, 901/42, 41; 74/490.05, 490.06
See application file for complete search history.

(56) References Cited

U.S. PATENT DOCUMENTS

| 4,250,918 A | * | 2/1981 | Tuson et al. | ................... 137/580 |
| 5,225,648 A | * | 7/1993 | Torii et al. | ........................ 901/42 |
| 5,777,267 A | * | 7/1998 | Szydel | ......................... 174/72 A |
| 7,559,590 B1 | * | 7/2009 | Jones | ............................... 901/29 |
| 2005/0189333 A1 | * | 9/2005 | Nakagiri et al. | ................ 901/42 |

FOREIGN PATENT DOCUMENTS

| JP | H5-14767 | | 2/1993 |
| JP | 10-332065 | | 12/1998 |
| JP | 2001-287188 | | 10/2001 |
| JP | 2002-307370 | | 10/2002 |
| JP | 2005-067336 A | | 3/2005 |
| JP | 2005-230989 A | | 9/2005 |
| WO | WO 91/14220 | * | 9/1991 |
| WO | WO 2005/053914 A | | 6/2005 |

* cited by examiner

*Primary Examiner* — Michael P Ferguson
(74) *Attorney, Agent, or Firm* — DLA Piper LLP (US)

(57) ABSTRACT

A swivel joint that is placed between a working device and a forwardly/reversely rotatable wrist section provided on a body section of an industrial robot and has a fluid transmission route for interconnecting the wrist section side and the working device side. The fluid transmission route is a hose, and between the wrist section and the working device, the hose is loosely spirally wound with a margin around a shaft section that rotates together with the wrist section. One end of the hose is non-rotatably fixed to the shaft section, and the other end is fixed so as to be movable with movement of the shaft section.

2 Claims, 6 Drawing Sheets (a)

(b)

SWIVEL JOINT

TECHNICAL FIELD

The present invention relates to a swivel joint that is placed between a working device and a wrist section including a forwardly/reversely rotatable shaft section provided on a body section of an industrial robot body of an industrial robot and a working device side such as a welding gun or a hand mounted to a tip of the wrist section, and easily transmits a fluid such as a coolant (for example, water) or working oil from the wrist section side to the working device side.

BACKGROUND ART

As a conventional swivel joint, there is a swivel joint 30 shown in FIGS. 1 and 2 in Japanese Patent Laid-Open No. 10-332065. The swivel joint 30 includes three members of an inner cylinder 31, a middle cylinder 32, and an outer cylinder 33, hydraulic oil from a hydraulic pump is supplied through an inner cylinder oil passage 311, a middle cylinder oil passage 321, and an outer cylinder oil passage 331 formed in the cylinders 31, 32 and 33, respectively, to each hydraulic actuator, or drain oil from each actuator flows into a tank.

Specifically, the drain oil from the actuator flows through a body section 331a of the outer cylinder oil passage 331 into an outer annular groove 331c, then flows through a communication hole 321c in the middle cylinder oil passage 321 into an inner annular groove 321d, further flows through a communication hole 311c into a body section 311a of the inner cylinder oil passage 311, and finally fed to the tank through a drain oil passage connected to a connecting portion 311b.

In the inner annular groove 321d and the outer annular groove 331c, annular packings (O-rings) 34 and 35 are provided having slide surfaces on an outer peripheral surface of the inner cylinder or an outer peripheral surface of the middle cylinder to prevent communication between the annular grooves and leakage of the drain oil.

However, the drain oil flowing through the annular grooves directly comes into contact with the slide surfaces and the annular packings, and dust, impurity, or abrasive powder in the oil bites into the slide surfaces or wear of the packings is accelerated, thereby reducing life of the swivel joint itself.

Also, in the conventional swivel joint, the swivel joint and the working device are connected by fastening flanges thereof by a bolt, and when the packing or the like is damaged and needs replacement, it is necessary that the bolt is removed to remove the working device and then remove the swivel joint itself, and further the swivel joint is taken apart for replacement of a component such as the packing, which takes much labor.

BRIEF SUMMARY OF THE INVENTION

The present invention has an object to provide a swivel joint in which a fluid transmission path of such as a coolant, working oil, or drain oil is not influenced by dust or impurity in the fluid, a high sealing property is maintained, and replacement can be easily performed from outside when needed.

To achieve the above-described object, the present invention provides a swivel joint that is placed between a working device and a wrist section including a forwardly/reversely rotatable shaft section provided on a body section of an industrial robot body of an industrial robot and a working device side such as a welding gun or a hand mounted to a tip of the wrist section, characterized in that the fluid transmission path is a hose, and between the wrist section and the working device, the hose is loosely spirally wound with a margin around a shaft section that rotates together with the wrist section, and one end of the hose is non-rotatably fixed to the shaft section, and the other end is fixed so as to be movable with movement of the shaft section.

In the swivel joint, the hose may include a fluid supply hose that supplies a fluid from the wrist section side to the working device side, and a fluid return hose that returns the fluid from the working device side to the wrist section side.

In either of the swivel joints, the hose may be supported by a bulkhead mounted rotatably together with the shaft section.

As described above, the swivel joint of the present invention includes the fluid transmission path for a coolant, working oil, or drain oil is constituted by the hose, and thus has a high sealing property. Also, the fluid flowing through the hose does not directly come into contact with a rotating shaft or the like, and can smoothly flow through the hose without being influenced by dust or impurity in the fluid, and replacement of the hose can be easily performed from outside when needed.

Figure 1:
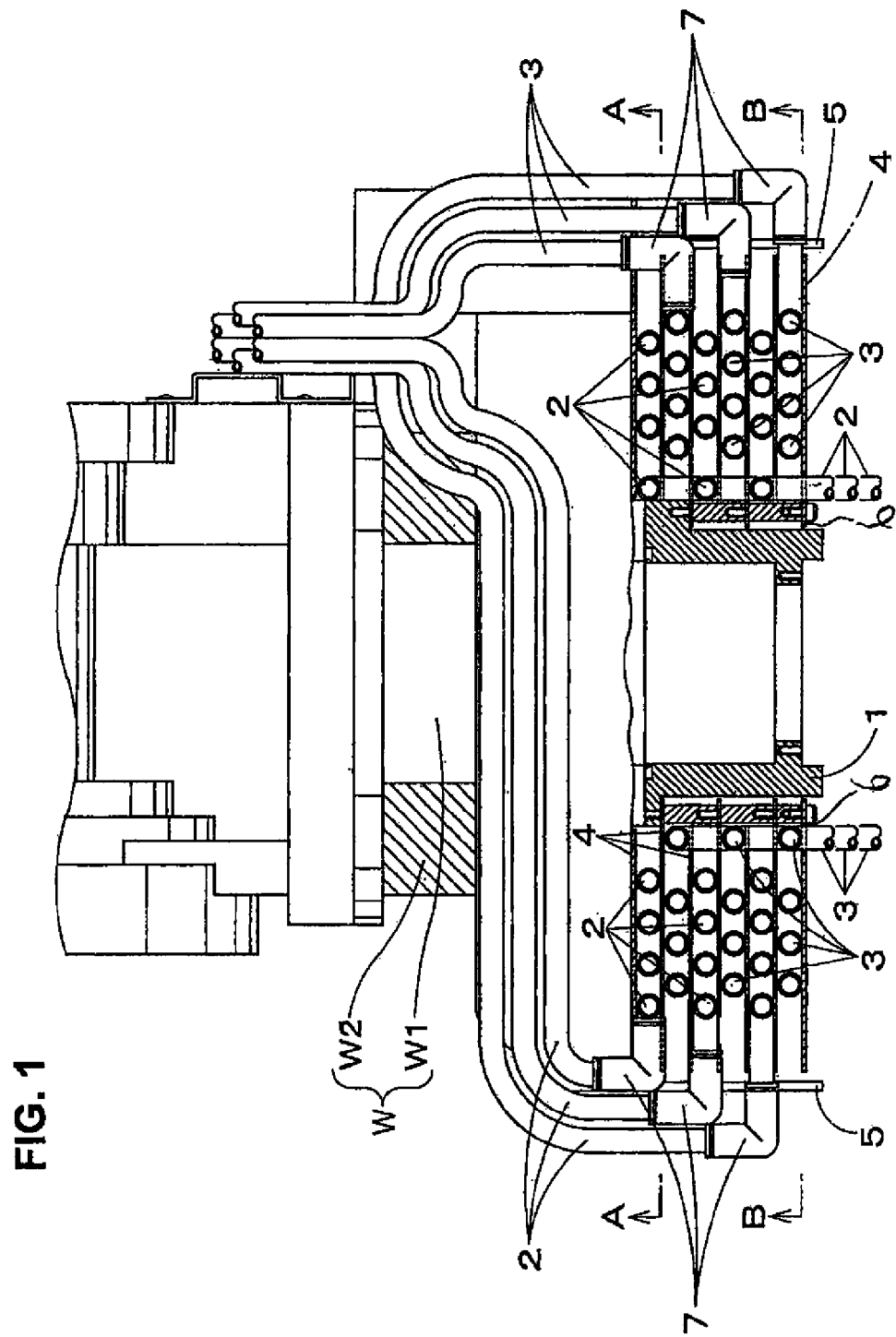
FIG. 1 is a partial sectional view of a swivel joint of the present invention.

DESCRIPTION OF SYMBOLS 1 rotating section
2 fluid supply hose
3 fluid return hose
4 bulkhead
5 fixed wall
6 notch groove
7 L-shaped pipe joint

DETAILED DESCRIPTION OF THE INVENTION

Now, embodiments as the best mode for carrying out a swivel joint of the present invention will be described with reference to the drawings.

Figure 2:
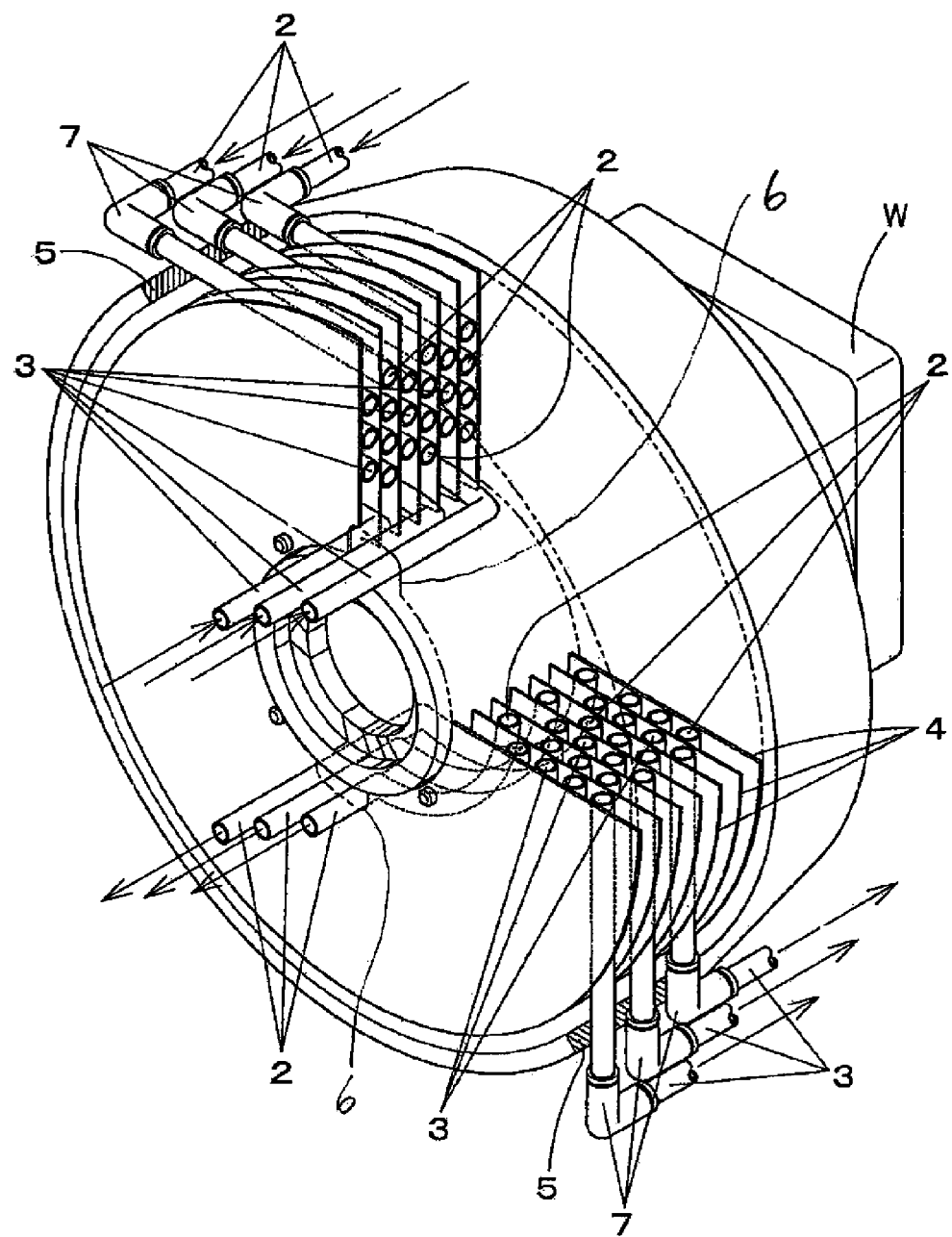
FIG. 2 is a perspective view, partially in section, of the swivel joint of the present invention.
Figure 3:
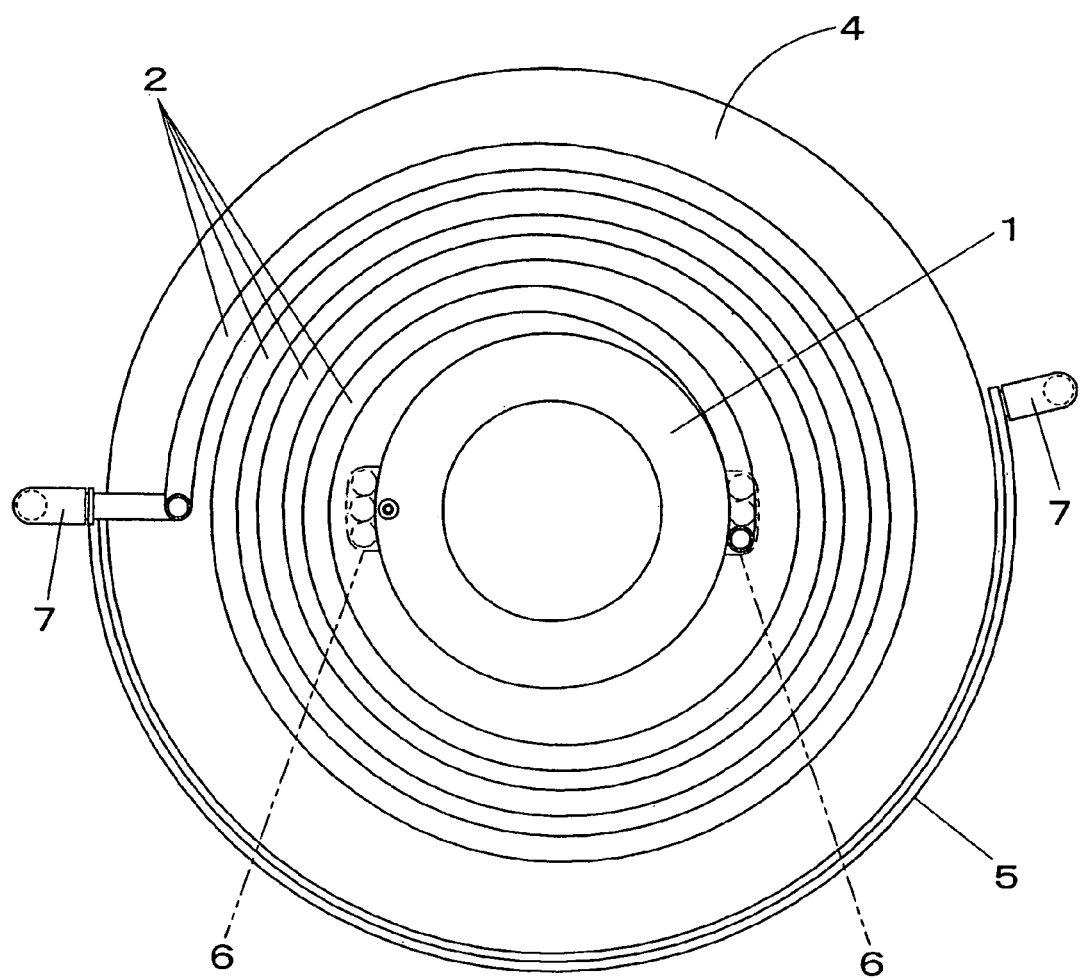
FIG. 3 is a sectional view taken along the line A-A in FIG. 1.
Figure 4:
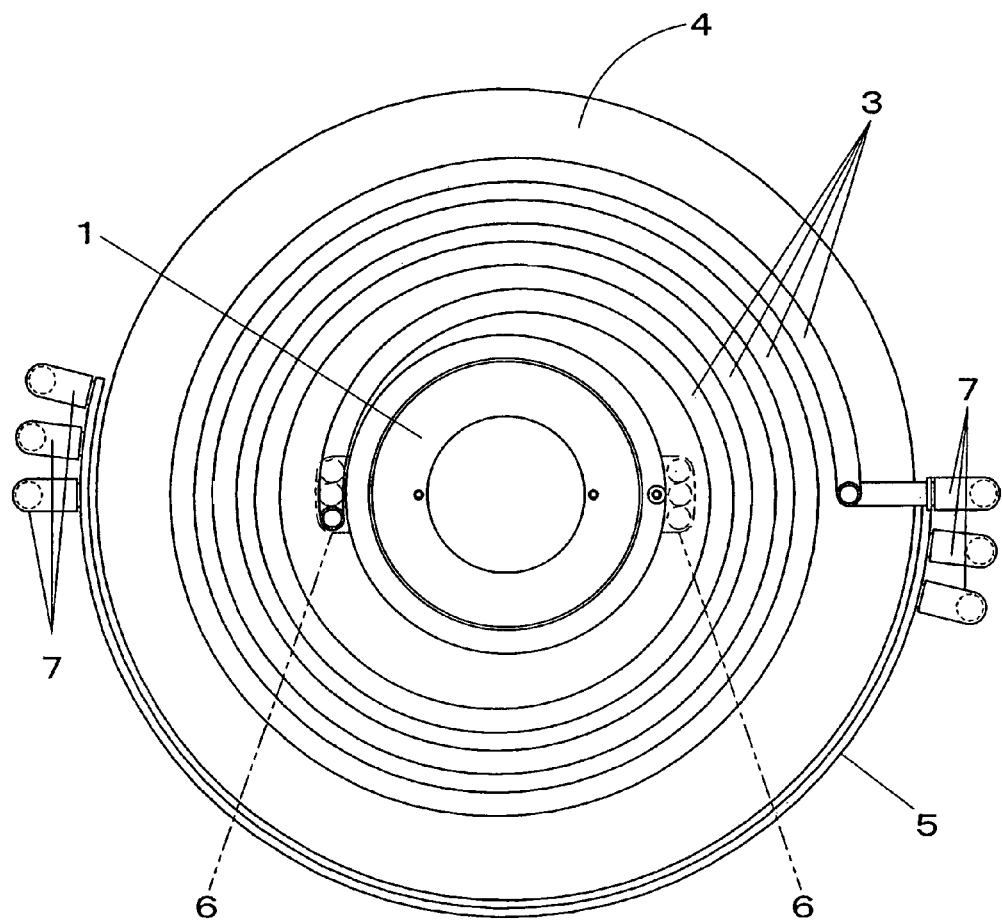
FIG. 4 is a sectional view taken along the line B-B in FIG. 1.
Figure 5:
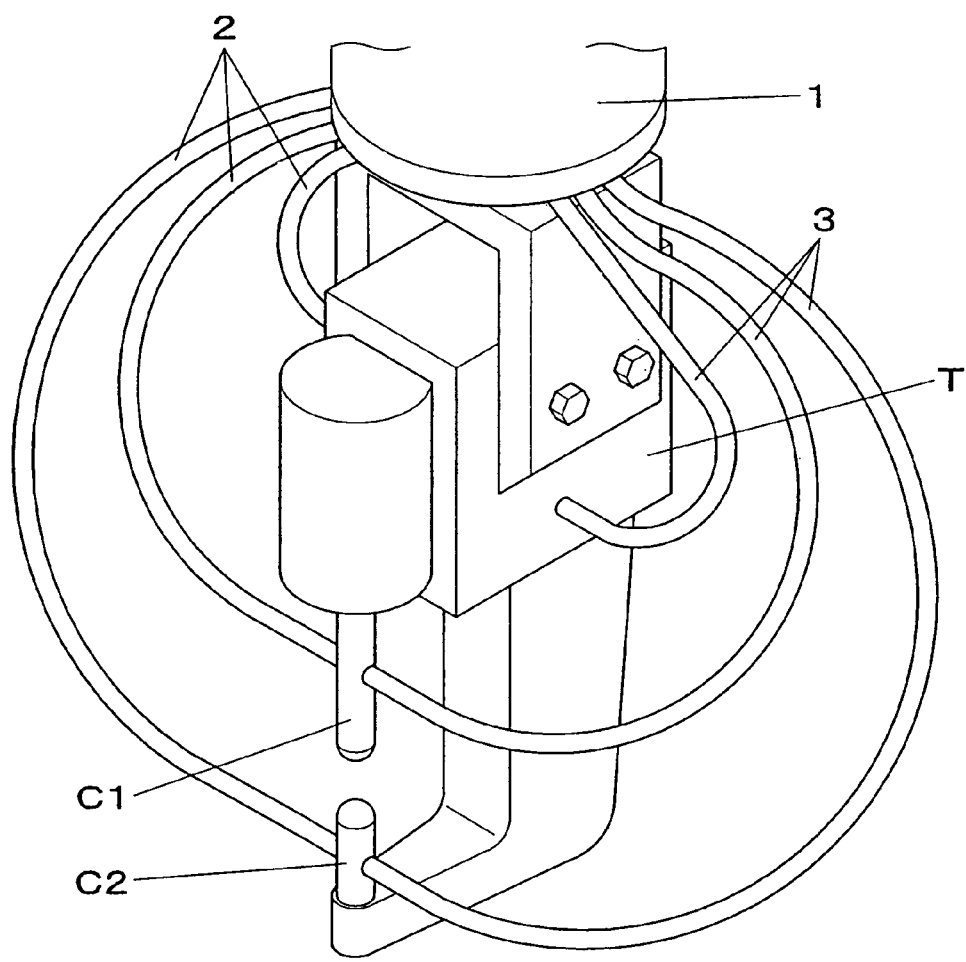
FIG. 5 is a perspective view of a state where a hose is connected to a working device.
Figure 6:
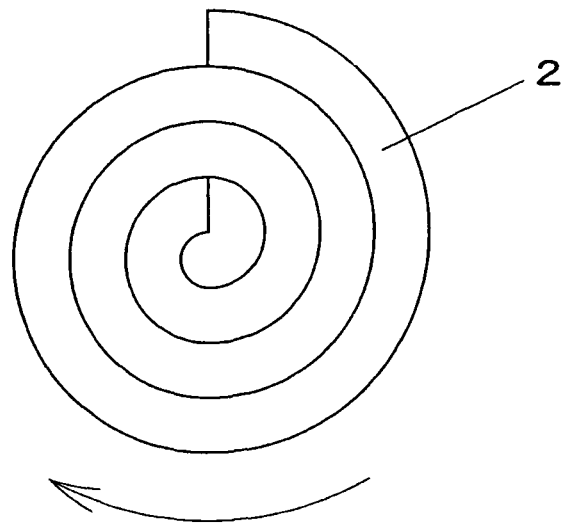
FIG. 6 illustrates a diameter change of the hose.
Figure 6:
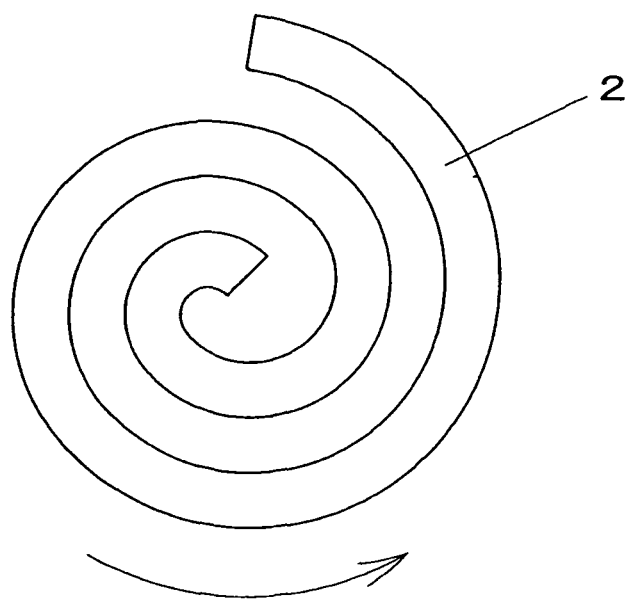

FIG. 1 is a partial sectional view of the swivel joint, FIG. 2 is a perspective view, partially in section, of the swivel joint, FIG. 3 is a sectional view taken along the line A-A in FIG. 1, FIG. 4 is a sectional view taken along the line B-B in FIG. 1, FIG. 5 is a perspective view of a state where hoses 2 and 3 are connected to a working device, and FIG. 6 illustrates a diameter change of the hose.

[Concerning General Configuration of Swivel Joint]

As shown in FIGS. 1 and 2, the swivel joint includes a rotating section 1 connected rotatably together with a rotating shaft W1 that constitutes a wrist section W of an industrial robot, a plurality of hoses 2 and 3 loosely spirally wound with a margin around an outer periphery of the rotating section 1, a plurality of bulkheads 4 that can house the plurality of hoses 2 and 3 in multiple stages, and a fixed wall 5 that non-rotatably fixes one end of each of the hoses 2 and 3 in outer peripheral portions of the bulkheads 4.

Although not shown, the swivel joint may include electric power supply means including a disk-shaped slip ring and a brush so as to supply electric power from the robot body side to a working device, between a fixed outside non-rotatable section W2 that constitutes the wrist section W and the rotating section 1.

As shown in FIG. 5, a working device such as a robot hand or a welding gun is mounted to a tip of the rotating section 1.

Rotation of the rotating section 1 (rotation of the rotating shaft W1 of the wrist section W) in Embodiment 1 includes a concept of forward/reverse rotation and pivot.

[Concerning Hoses 2 and 3, Bulkheads 4, and Fixed Wall 5]

As shown in FIGS. 1 and 2, the hoses 2 and 3 include two types of hoses: three fluid supply hoses 2 that supply a fluid such as a coolant (for example, water) or working oil from the robot body side to the working device side, and three fluid return hoses 3 that return the coolant or drain oil heated by the working device from the working device side to the robot body side. The hoses 2 and 3 may be tubes made of flexible members such as resin, rubber, or metal tubes, through which a fluid flows.

The bulkheads 4 include seven doughnut-shaped metal plates, and mounted at spaced intervals around the rotating section 1 to form six annular spaces, which house the hoses 2 and 3. Each annular space has such a space that allows a diameter change or movement of the hoses 2 and 3 with rotation of the rotating section 1 with the hoses being loosely spirally wound. As shown in FIG. 1, the bulkhead 4 is fixed to the rotating section 1 by fastening means such as a screw on an inner peripheral side thereof, and is thus rotatable together with the rotating section 1. Further, two notch grooves 6 are provided in an inner peripheral portion of each bulkhead 4 at 180° intervals, and the other end of each of the hoses 2 and 3 wound around the rotating section 1 is led through the notch grooves 6 to the working device connected to a downstream side of the rotating section 1.

The fixed wall 5 is a metal member formed to cover a half of outer peripheries of the plurality of bulkheads 4, and is fixed to the fixed outside non-rotatable section W2 that constitutes the wrist section W non-rotatably with respect to the rotating section 1. A total of six L-shaped pipe joints 7, three in one set, are mounted to the fixed wall 5 at 180° intervals, and one end of each of the hoses 2 and 3 extended from the robot body side are wound around the rotating section 1 via the L-shaped pipe joints 7. At this time, since the fixed wall 5 is formed to cover only the half of the outer peripheries of the bulkheads 4 (a section without the fixed wall 5 forms an opening), the hoses 2 and 3 can be easily introduced from the opening into the annular spaces formed by the bulkheads 4, and easily spirally wound around the rotating section 1 through the opening. Specifically, mounting and replacement of the hoses 2 and 3 are easily performed.

[Concerning Wiring of Hoses 2 and 3]

As shown in FIG. 1, the three fluid supply hoses 2 and the three return hoses 3 each brought together in one bundle are extended from the robot body side through an arm to the wrist section W, clamped once near the wrist section W, and then divided so that the supply hoses 2 are extended toward the L-shaped pipe joints 7 on the fixed wall 5 on one side (left side in FIG. 1) and the return hoses 3 are extended toward the L-shaped pipe joints 7 on the fixed wall 5 on the other side (right side in FIG. 1). Then, the hoses 2 and 3 are turned so as to be fixed in the L-shaped pipe joints 7 and be substantially parallel to the bulkheads 4, and introduced into the annular spaces formed by the bulkheads 4. The supply hoses 2 and the return hoses 3 are alternately housed in the annular spaces in the multiple stages.

As shown in FIG. 3, each of the fluid supply hoses 2 fixed on the introducing side into the annular space is loosely spirally wound clockwise around the rotating section 1, and then extended through one notch groove 6 (notch groove on the right side in FIG. 3) provided in the inner peripheral portion of the bulkhead 4 to the working device connected to the downstream side of the rotating section 1.

On the other hand, as shown in FIG. 4, each of the return hoses 3 fixed on the introducing side into the annular space is loosely spirally wound counterclockwise around the rotating section 1, and then extended through the other notch groove 6 (notch groove on the left side in FIG. 4) provided in the inner peripheral portion of the bulkhead 4 to the working device connected to the downstream side of the rotating section 1.

Finally, in this embodiment, as shown in FIG. 5, the three fluid supply hoses 2 and the three return hoses 3 are connected to a transformer T, an upper chip C1, and a lower chip C2 that constitute the working device, and form a circulation path that supplies a coolant or the like from the robot body side to these members that constitute the working device, and further returns the fluid from the working device side to the robot body side.

The hoses 2 and 3 can address rotation of ±360° or more according to the length of winding or the manner of winding (loose or firm winding) around the rotating section 1.

[Use State of Swivel Joint]

As shown in FIG. 6(a), when the rotating section 1 of the swivel joint starts rotating clockwise, the bulkhead 4 fixed rotatably together with the rotating section 1 simultaneously starts rotating, and thus the supply hose 2 fixed on one side to the L-shaped pipe joint 7 on the fixed wall 5 and inserted on the other side into the notch groove 6 in the bulkhead 4 is moved with the rotation of the rotating section 1, and winding of the supply hose 2 is tightened so that the diameter of the loose spiral around the rotating section 1 is reduced.

On the other hand, as shown in FIG. 6(b), when the rotating section 1 of the swivel joint starts rotating counterclockwise, the hose 2 tightly wound around the rotating section 1 is moved with the rotation of the rotating section 1, and winding of the supply hose 2 is loosened so that the diameter of the spiral is increased.

The return hose 3 is wound around the rotating section 1 in the direction opposite to that of the supply hose 2 (counterclockwise), thus when the supply hose 2 rotates in the "tightened" direction, the return hose 3 is loosened so as to be expanded from the central side by the rotating shaft, and when the supply hose 2 rotates in the "loosened" direction, the return hose 3 is tightened so as to be wound toward the central side by the rotating shaft.

[Outstanding Points of this Swivel Joint]

In this swivel joint, the diameter of the spiral of each of the hoses 2 and 3 changes with rotation of the rotating section 1, and thus the hoses are not twisted or do not entangle, thereby allowing smooth wiring of the hoses 2 and 3 from the wrist side to the working device side or from the working device side to the wrist side.

The swivel joint includes the hoses 2 and 3, the bulkheads 4, the fixed wall 5, and the L-shaped pipe joints 7, and each of the components can be relatively easily machined and produced at low cost.

Further, the fluid flows through the hose, and a slide surface of the hose (outer peripheral surface of the hose) does not directly come into contact with the fluid with rotation of the rotating section 1, and thus the hose is not influenced by impurity or the like in the fluid, if any, allowing an increase in life.

Further, since the hose is merely spirally wound around the rotating section 1, the structure is simple, and replacement of the hose can be easily performed without removing the working device from the swivel joint or taking the swivel joint itself apart.

[Concerning Other Embodiments]

A removable protective cover that covers the opening of the fixed wall 5 may be provided. This can prevent damage to the hoses 2 and 3 due to spatter (molten iron particles flying during welding) generated during working with a working device such as a welding gun.

Also, grease (lubricant) or wax may be applied to each of the bulkheads 4 and the hoses 2 and 3 to allow a smooth diameter change and slide of the hoses 2 and 3 in the annular spaces during rotation. This prevents damage or degradation of the hoses due to friction and increases service life.

Further, in the above-described embodiment, one end of each of the hoses 2 and 3 is inserted into the notch groove 6 in the bulkhead 4 so that the hoses 2 and 3 are rotatable together with the rotating section 1. However, not limited to this, as long as the hoses can follow the rotation of the rotating section 1, a hollow section inside the rotating section 1 and a hole that provides communication between an outer peripheral wall of the rotating section 1 and the hollow section may be provided so as to introduce the hoses 2 and 3 to the inside of the rotating section 1.

The invention claimed is:

1. A swivel joint between a working device and a wrist joint of an industrial robot, the wrist joint comprising a forwardly/reversely rotatable shaft and a concentric non-rotatable wall extending from a body section of the industrial robot, the working device mounted on a distal end of the shaft, said swivel joint comprising:
 a fluid transmission path for interconnecting the wrist joint and the working device;
 a hub rotatably fixed to the shaft;
 a plurality of bulkheads, each comprising a doughnut-shaped metal plate having a central aperture, the bulkheads being mounted at axially spaced apart regular intervals around the shaft, thereby defining a plurality of annular spaces, the bulkheads being fixed to the shaft via the rotating hub so that the torque of the shaft is transmitted thereto and the bulkheads rotate together with the shaft section; and
 a fixed metal wall coupled to the non-rotatable wall of wrist joint so that torque of the shaft is not transmitted thereto, and concentrically surrounding the plurality of bulkheads;
 said fluid transmission path comprising a fluid supply hose and a fluid return hose, wherein between said wrist joint and said working device, the hoses are loosely spirally wound with a margin around the shaft within the plurality of annular spaces in opposing clockwise and counterclockwise directions, respectively, one end of each of the hoses being fixed to said fixed wall, each hose axially extending through the central apertures of the bulkheads such that the other end of each of the hoses is fixed to the working device and so as to be movable with movement of said forwardly/reversely rotatable shaft;
 an inner peripheral portion of the central aperture of each of said plurality of bulkheads has two separate opposing notches, one of said two notches in each of said plurality of bulkheads is for receiving the fluid supply hose, another of said two notches in each of said plurality of bulkheads is for receiving the fluid return hose, the plurality of annular spaces housing said hoses loosely spirally wound with a margin, an axially extending portion of said fluid supply hose extending through the notch for said fluid supply hose, and an axially extending portion of said fluid return hose extending through the another notch in each of the plurality of bulkheads for said fluid return hose.

2. A swivel joint between a working device and a wrist joint of an industrial robot, the wrist joint comprising a forwardly/reversely rotatable shaft and a concentric non-rotatable wall extending from a body section of the industrial robot, the working device mounted on a distal end of the shaft, said swivel joint comprising:
 a fluid transmission path for interconnecting the wrist joint and the working device;
 a hub rotatably fixed to the shaft;
 a plurality of bulkheads, each comprising a doughnut-shaped metal plate having a central aperture, the bulkheads being mounted at axially spaced apart regular intervals around the shaft, thereby defining a plurality of annular spaces, the bulkheads being fixed to the shaft via the rotating hub so that the torque of the shaft is transmitted thereto and the bulkheads rotate together with the shaft section; and
 a fixed metal wall coupled to the non-rotatable wall of wrist joint so that torque of the shaft is not transmitted thereto, and concentrically surrounding the plurality of bulkheads;
 said fluid transmission path comprising a fluid supply hose and a fluid return hose, wherein between said wrist joint and said working device, the hoses are loosely spirally wound with a margin around the shaft within the plurality of annular spaces in opposing clockwise and counterclockwise directions, respectively, one end of each of the hoses being fixed to said fixed wall, each hose axially extending through the central apertures of the bulkheads such that the other end of each of the hoses is fixed to the working device and so as to be movable with movement of said forwardly/reversely rotatable shaft;
 an inner peripheral portion of the central aperture of each of said plurality of bulkheads has two separate opposing notches, one of said two notches in each of said plurality of bulkheads is for receiving the fluid supply hose, another of said two notches in each of said plurality of bulkheads for receiving the fluid return hose,
 the plurality of annular spaces housing said hoses loosely spirally wound with a margin, an axially extending portion of said fluid supply hose extending through the one of said notches in each of said plurality of bulkheads for said fluid supply hose, an axially extending portion of said fluid return hose extending through the another of said notches in each of the plurality of bulkheads for said fluid return hose, and each of said fluid supply hose and said fluid return hose capable of transmitting two or more different kinds of fluids.

\* \* \* \* \*